United States Patent [19]
Jewell et al.

[11] Patent Number: 6,018,295
[45] Date of Patent: Jan. 25, 2000

[54] VEHICLE SAFETY LIGHT SYSTEM

[76] Inventors: Kirk A. Jewell; Elizabeth Jewell, both of 3010 Gleeson Ln., Louisville, Ky. 40299

[21] Appl. No.: 09/135,462

[22] Filed: Aug. 17, 1998

[51] Int. Cl.[7] .................................................. B60Q 1/26
[52] U.S. Cl. ...................... 340/468; 340/464; 340/467; 340/475; 340/479; 340/471
[58] Field of Search ............................... 340/463, 464, 340/466, 467, 468, 469, 471, 472, 475, 478, 479, 331, 332; 307/10.8; 315/77, 200 A; 362/540, 541, 542

[56] References Cited

U.S. PATENT DOCUMENTS

| | | | |
|---|---|---|---|
| 5,166,672 | 11/1992 | Duneau | 340/815.17 |
| 5,255,164 | 10/1993 | Eidelman | 362/80 |
| 5,430,625 | 7/1995 | Abarr et al. | 362/80 |
| 5,467,071 | 11/1995 | Koening | 340/433 |
| 5,467,073 | 11/1995 | Elias | 340/464 |
| 5,497,304 | 3/1996 | Caine | 362/80 |
| 5,770,999 | 6/1998 | Rhodes | 340/468 |
| 5,893,638 | 4/1999 | Hufner et al. | 362/506 |

*Primary Examiner*—Daryl Pope
*Attorney, Agent, or Firm*—Joseph N. Breaux

[57] ABSTRACT

A vehicle safety light system that includes at least one left and right light elements each having multiple light emitting devices arranged in a row, a light element controller in controlling connection with each of the multiple light emitting devices of the left and right light elements, an on/off switch in connection with an on/off input of the light element controller, a full-speed blink mode activation switch in connection with a full-speed blink mode input of the light element controller, a half-speed blink mode activation switch in connection with a half-speed blink mode input of the light element controller, and a vehicle brake pedal activated, light blinking speed controller having a variable resistance control output in connection with a variable blink speed input of the light element controller. The light element controller turning on all light elements when the vehicle engine is operating, extinguishing all of the light emitting devices when receiving an off signal on the on/off input and an operating in the half-speed blink mode when a half-speed blink mode activation signal is received at the half-speed blink mode input and in the full-speed blink mode when a full-speed blink activation signal is received at the full-speed blink mode input. The light element controller shifting to the variable speed blink mode when the resistance of the variable resistance control output of the vehicle brake pedal activated light blinking speed controller changes from a predetermined resistance value.

1 Claim, 2 Drawing Sheets

VEHICLE SAFETY LIGHT SYSTEM

DESCRIPTION

1. Technical Field

The present invention relates to safety devices for vehicles and more particularly to a vehicle safety light system that includes at least one left and at least one right light element each having multiple light emitting devices arranged in a row, a light element controller in controlling connection with each of the multiple light emitting devices of the at least one left and at least one right light elements, a vehicle operation status sensor in connection with a vehicle operation status input of the light element controller, a left turn blinker status sensor in connection with a left turn blinker status input of the light element controller, a right turn blinker status sensor in connection with a right turn blinker status input of the light element controller, an on/off switch in connection with an on/off input of the light element controller, a full-speed blink mode activation switch in connection with a full-speed blink mode input of the light element controller, a half-speed blink mode activation switch in connection with a half-speed blink mode input of the light element controller, and a vehicle brake pedal activatable, light blinking speed controller having a variable resistance control output in connection with a variable blink speed input of the light element controller; the light element controller extinguishing all of the light emitting devices of the at least one left and at least one right light elements when receiving an "off" signal on the on/off input; the light element controller illuminating all of the light emitting devices of the at least one left and at least one right light elements when receiving a "vehicle operating" signal from the vehicle operation status sensor on the vehicle operation status input of the light element controller and an "on" signal on the on/off input; the light element controller operating in the half-speed blink mode when a half-speed blink mode activation signal is received at the half-speed blink mode input and in the full-speed blink mode when a full-speed blink activation signal is received at the full-speed blink mode input; the light element controller periodically illuminating all of the multiple light emitting devices of the at least one left and at least one right light elements and periodically extinguishing all of the multiple light emitting devices of the at least one left and at least one right light elements at a first frequency when operating in the full-speed blink mode and at a second frequency, lower than the first frequency, when operating in the half-speed blink mode; the light element controller shifting to the variable speed blink mode when the resistance of the variable resistance control output of the vehicle brake pedal activated light blinking speed controller changes from a predetermined resistance value; the light element controller periodically illuminating all of the multiple light emitting devices of the at least one left and at least one right light elements and periodically extinguishing all of the multiple light emitting devices of the at least one left and at least one right light elements at a variable frequency corresponding to the resistance of the variable resistance control output of the vehicle brake pedal activated light blinking speed controller in connection with the variable blink speed input of the light element controller when operating in the variable speed blink mode; the light element controller periodically illuminating all of the multiple light emitting devices of the at least one right light element and periodically extinguishing all of the multiple light emitting devices of the at least one right light element at a frequency that matches and corresponds to the right turn signal blink frequency of a vehicle when the right turn blinker status provides a "right blinker on" signal to the right turn blinker status input of the light element controller; the light element controller periodically illuminating all of the multiple light emitting devices of the at least one left light element and periodically extinguishing all of the multiple light emitting devices of the at least one left light element at a frequency that matches and corresponds to the left turn signal blink frequency of a vehicle when the left turn blinker status sensor provides a "left blinker on" signal to the left turn blinker status input of the light element controller.

2. Background Art

Many vehicle side impact accidents occur because one party does not see the side of the other vehicle. It would be a benefit, therefore, to have a safety light system for vehicles that provided lights along the side panels of the vehicle to increase the visibility of the vehicle to other drivers. Because it could be beneficial to illuminate the side panels of the vehicle differently under different traffic and weather conditions, it would be a further benefit to have a vehicle safety lighting system that included at least two illumination modes, a continuous operation mode and a blinking mode.

GENERAL SUMMARY DISCUSSION OF INVENTION

It is thus an object of the invention to provide a vehicle safety light system that provides lights along the side panels of the vehicle to increase the visibility of the vehicle to other drivers that is activated when the vehicle engine is operating.

It is a further object of the invention to provide a vehicle safety light system that includes at least two illumination modes for illuminating the side panels of a vehicle differently under different traffic and weather conditions.

It is a still further object of the invention to provide a vehicle safety light system that includes at least one left and at least one right light element each having multiple light emitting devices arranged in a row, a light element controller in controlling connection with each of the multiple light emitting devices of the at least one left and at least one right light elements, a vehicle operation status sensor in connection with a vehicle operation status input of the light element controller, a left turn blinker status sensor in connection with a left turn blinker status input of the light element controller, a right turn blinker status sensor in connection with a right turn blinker status input of the light element controller, an on/off switch in connection with an on/off input of the light element controller, a full-speed blink mode activation switch in connection with a full-speed blink mode input of the light element controller, a half-speed blink mode activation switch in connection with a half-speed blink mode input of the light element controller, and a vehicle brake pedal activatable, light blinking speed controller having a variable resistance control output in connection with a variable blink speed input of the light element controller; the light element controller extinguishing all of the light emitting devices of the at least one left and at least one right light elements when receiving an "off" signal on the on/off input; the light element controller illuminating all of the light emitting devices of the at least one left and at least one right light elements when receiving a "vehicle operating" signal from the vehicle operation status sensor on the vehicle operation status input of the light element controller and an "on" signal on the on/off input; the light element controller operating in the half-speed blink mode when a half-speed blink mode activation signal is received at the half-speed blink mode input and in the full-speed blink mode when a full-speed blink activation signal is received at the full-speed blink mode input; the light element controller periodically illuminating all of the multiple light emitting devices of the at least one left and at least one right light elements and periodically extinguishing all of the multiple light emitting devices of the at least one left and at least one right light elements at a first frequency when operating in the full-speed blink mode and at a second frequency, lower than the first frequency, when operating in the half-speed blink mode; the light element controller shifting to the variable speed blink mode when the resistance of the variable resistance control output of the vehicle brake pedal activated light blinking speed controller changes from a predetermined resistance value; the light element controller periodically illuminating all of the multiple light emitting devices of the at least one left and at least one right light elements and periodically extinguishing all of the multiple light emitting devices of the at least one left and at least one right light elements at a variable frequency corresponding to the resistance of the variable resistance control output of the vehicle brake pedal activated light blinking speed controller in connection with the variable blink speed input of the light element controller when operating in the variable speed blink mode; the light element controller periodically illuminating all of the multiple light emitting devices of the at least one right light element and periodically extinguishing all of the multiple light emitting devices of the at least one right light element at a frequency that matches and corresponds to the right turn signal blink frequency of a vehicle when the right turn blinker status provides a "right blinker on" signal to the right turn blinker status input of the light element controller; the light element controller periodically illuminating all of the multiple light emitting devices of the at least one left light element and periodically extinguishing all of the multiple light emitting devices of the at least one left light element at a frequency that matches and corresponds to the left turn signal blink frequency of a vehicle when the left turn blinker status sensor provides a "left blinker on" signal to the left turn blinker status input of the light element controller.

It is a still further object of the invention to provide a vehicle safety light system that accomplishes some or all of the above objects in combination.

Accordingly, a vehicle safety light system is provided. The vehicle safety light system includes at least one left and at least one right light element each having multiple light emitting devices arranged in a row, a light element controller in controlling connection with each of the multiple light emitting devices of the at least one left and at least one right light elements, a vehicle operation status sensor in connection with a vehicle operation status input of the light element controller, a left turn blinker status sensor in connection with a left turn blinker status input of the light element controller, a right turn blinker status sensor in connection with a right turn blinker status input of the light element controller, an on/off switch in connection with an on/off input of the light element controller, a full-speed blink mode activation switch in connection with a full-speed blink mode input of the light element controller, a half-speed blink mode activation switch in connection with a half-speed blink mode input of the light element controller, and a vehicle brake pedal activatable, light blinking speed controller having a variable resistance control output in connection with a variable blink speed input of the light element controller; the light element controller extinguishing all of the light emitting devices of the at least one left and at least one right light elements when receiving an "off" signal on the on/off input; the light element controller illuminating all of the light emitting devices of the at least one left and at least one right light elements when receiving a "vehicle operating" signal from the vehicle operation status sensor on the vehicle operation status input of the light element controller and an "on" signal on the on/off input; the light element controller operating in the half-speed blink mode when a half-speed blink mode activation signal is received at the half-speed blink mode input and in the full-speed blink mode when a full-speed blink activation signal is received at the full-speed blink mode input; the light element controller periodically illuminating all of the multiple light emitting devices of the at least one left and at least one right light elements and periodically extinguishing all of the multiple light emitting devices of the at least one left and at least one right light elements at a first frequency when operating in the full-speed blink mode and at a second frequency, lower than the first frequency, when operating in the half-speed blink mode; the light element controller shifting to the variable speed blink mode when the resistance of the variable resistance control output of the vehicle brake pedal activated light blinking speed controller changes from a predetermined resistance value; the light element controller periodically illuminating all of the multiple light emitting devices of the at least one left and at least one right light elements and periodically extinguishing all of the multiple light emitting devices of the at least one left and at least one right light elements at a variable frequency corresponding to the resistance of the variable resistance control output of the vehicle brake pedal activated light blinking speed controller in connection with the variable blink speed input of the light element controller when operating in the variable speed blink mode; the light element controller periodically illuminating all of the multiple light emitting devices of the at least one right light element and periodically extinguishing all of the multiple light emitting devices of the at least one right light element at a frequency that matches and corresponds to the right turn signal blink frequency of a vehicle when the right turn blinker status provides a "right blinker on" signal to the right turn blinker status input of the light element controller; the light element controller periodically illuminating all of the multiple light emitting devices of the at least one left light element and periodically extinguishing all of the multiple light emitting devices of the at least one left light element at a frequency that matches and corresponds to the left turn signal blink frequency of a vehicle when the left turn blinker status sensor provides a "left blinker on" signal to the left turn blinker status input of the light element controller.

BRIEF DESCRIPTION OF DRAWINGS

For a further understanding of the nature and objects of the present invention, reference should be had to the following detailed description, taken in conjunction with the accompanying drawings, in which like elements are given the same or analogous reference numbers and wherein.

EXEMPLARY MODE FOR CARRYING OUT THE INVENTION

Figure 1:
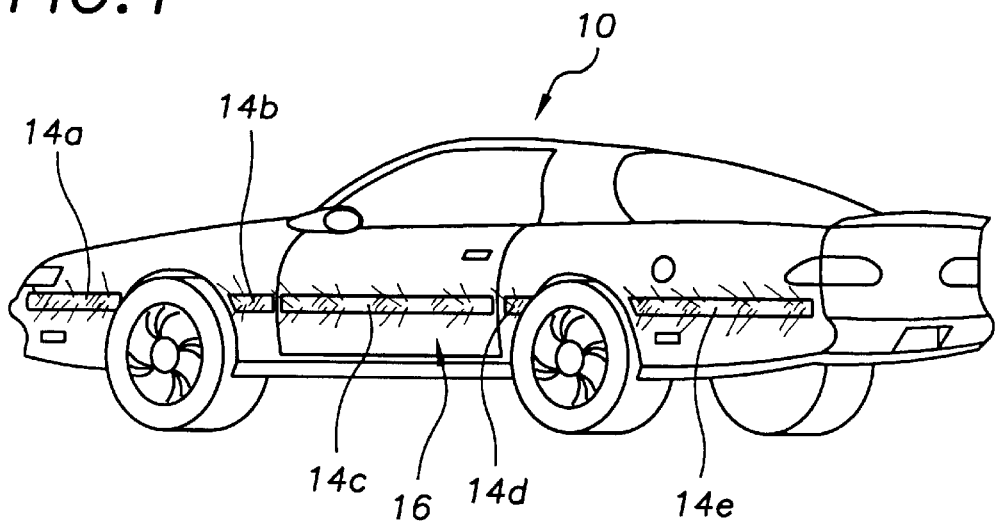
FIG. 1 is a perspective view of a representative vehicle with five external linear light elements of the vehicle safety light system of the present invention attached along the left side panels thereof.

FIG. 1 shows a representative vehicle, generally designated 10, having five external linear light elements 14a–e of an exemplary embodiment of the vehicle safety light system of the present invention, generally designated 16, attached along the left side panels thereof. An identical number of external linear light elements 18a–e (FIG. 2) of the exemplary embodiment of the vehicle safety light system 16 are attached along the other side thereof.

Figure 2:
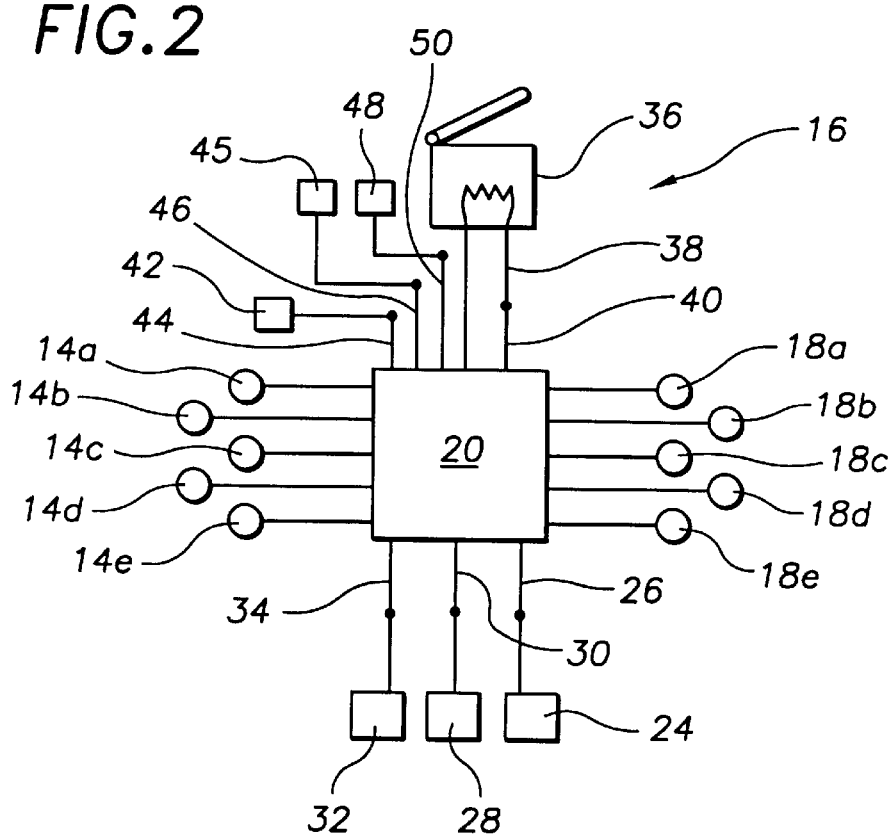
FIG. 2 is a schematic diagram showing an exemplary embodiment of the vehicle safety light system of the present invention showing the vehicle brake pedal activated light blinking speed controller with the variable resistance control output, the vehicle operation status sensor, the left turn blinker status sensor, the right turn blinker status sensor, the light element controller, and the user interface switches including the on/off switch, the half-speed blink mode activation switch, and the full speed blink mode activation switch.

Referring to FIG. 2, vehicle safety light system 16 includes a light element controller 20 in illumination controlling connection with each of multiple light emitting devices 21 (FIG. 3) of each light element 14a–e,18a–e; a two position on/off switch 24 in connection with an on/off input 26 of light element controller 20; a two position full-speed blink mode activation switch 28 in connection with a full-speed blink mode input 30 of light element controller 20; a two position half-speed blink mode activation switch 32 in connection with a half-speed blink mode input 34 of light element controller 20; a vehicle brake pedal activatable, light blinking speed controller, 36 having a variable resistance control output 38 in connection with a variable blink speed input 40 of light element controller 20; a vehicle operation status sensor 42 in connection with a vehicle operation status input 44 of light element controller 20; a left turn blinker status sensor 45 in connection with a left turn blinker status input 46 of light element controller 20; and a right turn blinker status sensor 48 in connection with a right turn blinker status input 50 of light element controller 20.

Figure 3:
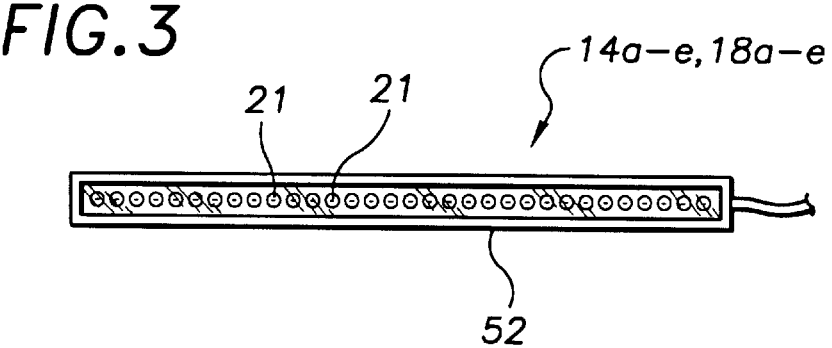
FIG. 3 is a top plan view of one of the one of the light elements of FIG. 1 showing the light element housing, the multiple LED's arranged in a row, and the power and control cord.
Figure 4:
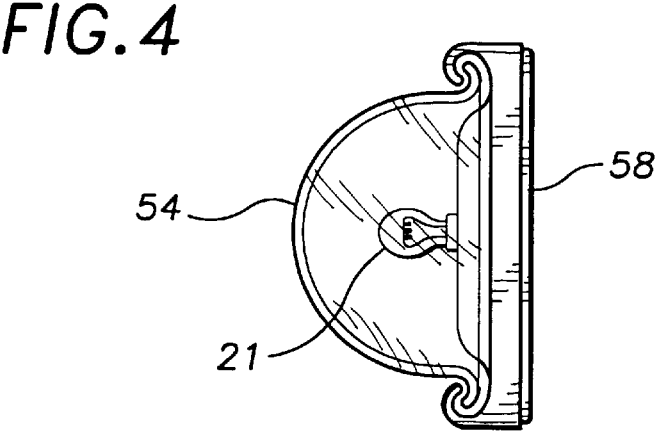
FIG. 4 is a side plan view showing an exemplary embodiment of one of the linear light elements of FIG. 1 showing the transparent light element cover, the light element housing, the power and control cord, and the optional adhesive strip provided on the underside of the light element housing.

With reference to FIG. 3, each light element 14a–e,18a–e, includes multiple light emitting devices 21, in this embodiment LEDs, that are arranged in a row within a rectangular shaped, plastic housing 52 and, referring to FIG. 4, covered by a transparent plastic shield 54. In this embodiment, the back surface 56 of housing 52 is covered with an adhesive layer 58 that is used to adhesively stick each light element 14a–e,18a–e to the side panel of a vehicle. Of course, other known methods of securing light elements 14a–e,18a–e to the side panels of a vehicle, such as molding fasteners, can be used if desired.

Referring back to FIG. 2, light element controller 20 is a conventional microprocessor based digital circuit that is programmed to extinguish all light emitting devices 21 of all light elements 14a–e,18a–e, when an "off" signal is received at on/off input 26; that illuminates all of the light emitting devices 21 of light elements 14a–e,18a–e when receiving a "vehicle operating" signal from vehicle operation status sensor 42 on vehicle operation status input 44 and an "on" signal on on/off input 26; that operates in the "full-speed blink model" when a blink mode activation signal is received at the full-speed blink mode input 30 and in the "half-speed blink mode" when a half-speed blinker activation signal is received at the half-speed blink mode input 34. Light element controller 20 periodically illuminates all of the multiple light emitting devices 21 (FIG. 3) of all light elements 14a–e,18a–e, and then periodically extinguishes all of the multiple light emitting devices 21 (FIG. 3) of all of the light elements 14a–e,18a–e, at a first frequency, when operating in the full-speed blink mode and at a second frequency, when operating in the half-speed blink mode. In this embodiment the first frequency is four hertz and the second frequency is two hertz.

Light element controller 20 shifts to the variable speed blink mode when the resistance of variable resistance control output 38 of vehicle brake pedal activated light blinking speed controller 36 changes from a predetermined resistance value. When in the variable speed blinking mode, the light element controller periodically illuminating all of the multiple light emitting devices of the light element and periodically extinguishing all of the multiple light emitting devices of the light element at a variable frequency that corresponds to the resistance of the variable resistance control output 38 of vehicle brake pedal activated light blinking speed controller 36.

Light element controller 20 periodically illuminates all of the multiple light emitting devices of right light elements 18a–e and periodically extinguishing all of the multiple light emitting devices 21 of right light element 18a–e at a frequency that matches and corresponds to the right turn signal blink frequency of vehicle 10 (FIG. 1) when right turn blinker status sensor 48 provides a "right blinker on" signal to right turn blinker status input 50 of light element controller 20. Light element controller 20 periodically illuminates all of the multiple light emitting devices 21 of the left light elements 14a–e and periodically extinguishing all of the multiple light emitting devices 21 of the left light element 14a–e at a frequency that matches and corresponds to the left turn signal blink frequency of vehicle 10 (FIG. 1) when left turn blinker status sensor 45 provides a "left blinker on" signal to left turn blinker status input 46 of light element controller 20.

Figure 5:
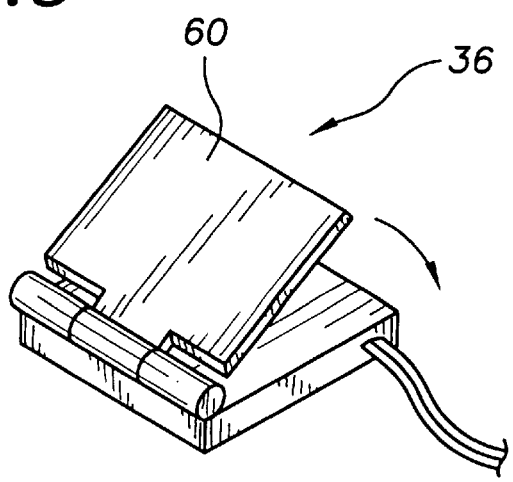
FIG. 5 is a detail perspective view showing the brake petal activated light blinking speed controller showing the spring loaded plunger extending outwardly from the controller housing.

Referring to FIG. 5, brake pedal activated light blinking speed controller 36 is positionable between the brake pedal and the floor of the vehicle during installation. Depressing the brake pedal of the vehicle causes the spring biased, hinged member 60 to pivot down toward a base portion 62. As hinged member 60 is pivoted, referring back to FIG. 2, the resistance of variable resistance control output 38 changes providing a signal to light element controller 20 of the speed of the vehicle. In this embodiment light element controller 20 is programmed such that the frequency of the blinking corresponds to the position of the brake pedal such that the more the brake pedal is depressed, the faster light elements 14a–e,18a–e (FIG. 1,3,4) blink.

It can be seen from the preceding description that a vehicle safety light system has been provided that provides lights along the side panels of the vehicle to increase the visibility of the vehicle to other drivers that is activated when the vehicle engine is operating; that includes at least two illumination modes for illuminating the side panels of a vehicle differently under different traffic and weather conditions; and that includes at least one left and at least one right light element each having multiple light emitting devices arranged in a row, a light element controller in controlling connection with each of the multiple light emitting devices of the at least one left and at least one right light elements, a vehicle operation status sensor in connection with a vehicle operation status input of the light element controller, a left turn blinker status sensor in connection with a left turn blinker status input of the light element controller, a right turn blinker status sensor in connection with a right turn blinker status input of the light element controller, an on/off switch in connection with an on/off input of the light element controller, a full-speed blink mode activation switch in connection with a full-speed blink mode input of the light element controller, a half-speed blink mode activation switch in connection with a half-speed blink mode input of the light element controller, and a vehicle brake pedal activatable, light blinking speed controller having a variable resistance control output in connection with a variable blink speed input of the light element controller; the light element controller extinguishing all of the light emitting devices of the at least one left and at least one right light elements when receiving an "off" signal on the on/off input; the light element controller illuminating all of the light emitting devices of the at least one left and at least one right light elements when receiving a "vehicle operating" signal from the vehicle operation status sensor on the vehicle operation status input of the light element controller and an "on" signal on the on/off input; the light element controller operating in the half-speed blink mode when a half-speed blink mode activation signal is received at the half-speed blink mode input and in the full-speed blink mode when a full-speed blink activation signal is received at the full-speed blink mode input; the light element controller periodically illuminating all of the multiple light emitting devices of the at least one left and at least one right light elements and periodically extinguishing all of the multiple light emitting devices of the at least one left and at least one right light elements at a first frequency when operating in the full-speed blink mode and at a second frequency, lower than the first frequency, when operating in the half-speed blink mode; the light element controller shifting to the variable speed blink mode when the resistance of the variable resistance control output of the vehicle brake pedal activated light blinking speed controller changes from a predetermined resistance value; the light element controller periodically illuminating all of the multiple light emitting devices of the at least one left and at least one right light elements and periodically extinguishing all of the multiple light emitting devices of the at least one left and at least one right light elements at a variable frequency corresponding to the resistance of the variable resistance control output of the vehicle brake pedal activated light blinking speed controller in connection with the variable blink speed input of the light element controller when operating in the variable speed blink mode; the light element controller periodically illuminating all of the multiple light emitting devices of the at least one right light element and periodically extinguishing all of the multiple light emitting devices of the at least one right light element at a frequency that matches and corresponds to the right turn signal blink frequency of a vehicle when the right turn blinker status provides a "right blinker on" signal to the right turn blinker status input of the light element controller; the light element controller periodically illuminating all of the multiple light emitting devices of the at least one left light element and periodically extinguishing all of the multiple light emitting devices of the at least one left light element at a frequency that matches and corresponds to the left turn signal blink frequency of a vehicle when the left turn blinker status sensor provides a "left blinker on" signal to the left turn blinker status input of the light element controller.

It is noted that the embodiment of the vehicle safety light system described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A vehicle safety light system comprising:

at least one left and at least one right light element each having multiple light emitting devices arranged in a row;

a light element controller in controlling connection with each of said multiple light emitting devices of said at least one left and said at least one right light elements;

a vehicle operation status sensor in connection with a vehicle operation status input of said light element controller;

a left turn blinker status sensor in connection with a left turn blinker status input of said light element controller;

a right turn blinker status sensor in connection with a right turn blinker status input of said light element controller;

an on/off switch in connection with an on/off input of said light element controller, a full-speed blink mode activation switch in connection with a full-speed blink mode input of said light element controller;

a half-speed blink mode activation switch in connection with a half-speed blink mode input of said light element controller; and a vehicle brake pedal activatable, light blinking speed controller having a variable resistance control output in connection with a variable blink speed input of said light element controller;

said light element controller extinguishing all of said light emitting devices of said at least one left and said at least one right light elements when receiving an "off" signal on said on/off input;

said light element controller illuminating all of said light emitting devices of said at least one left and said at least one right light elements when receiving a "vehicle operating" signal from said vehicle operation status sensor on said vehicle operation status input of said light element controller and an "on" signal on said on/off input;

said light element controller operating in a half-speed blink mode when a half-speed blink mode activation signal is received at said half-speed blink mode input and in a full-speed blink mode when a full-speed blink activation signal is received at said full-speed blink mode input;

said light element controller periodically illuminating all of said multiple light emitting devices of said at least one left and said at least one right light elements and periodically extinguishing all of said multiple light emitting devices of said at least one left and said at least one right light elements at a first frequency when operating in said full-speed blink mode and at a second frequency, lower than said first frequency, when operating in said half-speed blink mode;

said light element controller shifting to a variable speed blink mode when the resistance of said variable resistance control output of said vehicle brake pedal activated light blinking speed controller changes from a predetermined resistance value;

said light element controller periodically illuminating all of said multiple light emitting devices of said at least one left and said at least one right light elements and periodically extinguishing all of said multiple light emitting devices of said at least one left and said at least one right light elements at a variable frequency corresponding to said resistance of said variable resistance control output of said vehicle brake pedal activated light blinking speed controller in connection with said variable blink speed input of said light element controller when operating in said variable speed blink mode;

said light element controller periodically illuminating all of said multiple light emitting devices of said at least one right light element and periodically extinguishing all of said multiple light emitting devices of said at least one right light element at a frequency that matches and corresponds to said right turn signal blink frequency of a vehicle when said right turn blinker status provides a "right blinker on" signal to said right turn blinker status input of said light element controller;

said light element controller periodically illuminating all of said multiple light emitting devices of said at least one left light element and periodically extinguishing all of said multiple light emitting devices of said at least one left light element at a frequency that matches and corresponds to said left turn signal blink frequency of a vehicle when said left turn blinker status sensor provides a "left blinker on" signal to said left turn blinker status input of said light element controller.

\* \* \* \* \*